July 5, 1966 W. W. GARSTANG ETAL 3,259,818

CAPACITORS EMPLOYING NIO AS A DIELECTRIC

Filed June 27, 1963 3 Sheets-Sheet 1

Inventors
William W. Garstang
Robert L. Wolff
William S. Parsons
By Pendleton, Neuman,
Seibold & Williams
Atty.s

CAPACITORS EMPLOYING NIO AS A DIELECTRIC

Filed June 27, 1963 3 Sheets-Sheet 2

Inventors
William W. Garstang
Robert L. Wolff
William S. Parsons
BY
Pendleton, Neuman,
Seibold & Williams
Atty.'s July 5, 1966 W. W. GARSTANG ETAL 3,259,818

CAPACITORS EMPLOYING NIO AS A DIELECTRIC

Filed June 27, 1963 3 Sheets-Sheet 3

Inventors
William W. Garstang
Robert L. Wolff
William S. Parsons
By Pendleton, Neuman, Seibold & Williams
Att'ys

United States Patent Office 3,259,818

Patented July 5, 1966

3,259,818

CAPACITORS EMPLOYING NiO AS A DIELECTRIC

William W. Garstang and Robert L. Wolff, Milwaukee, and William S. Parsons, Nashotah, Wis., assignors to Globe-Union Inc., Milwaukee, Wis., a corporation of Delaware Filed June 27, 1963, Ser. No. 291,107
5 Claims. (Cl. 317—258)

This invention relates to capacitors, and particularly to capacitors adapted to be rigidly supported by a conductive wall, in electrically conductive relation therewith, one of the terminals of the capacitor being electrically connected to the wall.

Capacitors which are rigidly mounted on and connected to a conductive wall or chassis are commonly referred to as feed-thru or standoff capacitors, depending on whether or not the capacitor provides for a direct electrical connection between two terminals disposed on opposite sides of the chassis.

Feed-thru capacitors are advantageously employed in high frequency equipment such as in television tuners and the like, where high frequencies must be by-passed. In television tuners, for example, a tuning oscillator is commonly employed, which oscillator must be shielded to prevent radiation of certain high frequencies which would cause spurious operation of other portions of the circuit. However, these high frequencies can travel along the conductors supplying low frequency (such as filament) power to the oscillator. These conductors are, therefore, preferably brought out of the shielded oscillator compartment through feed-thru capacitors disposed in the shielding wall, which capacitors operate to by-pass high frequency signals to ground and thereby prevent undesirable radiation.

Such capacitors are also advantageous in that they perform mechanical functions along with their electrical functions. No special means for supporting such a capacitor is required, and the capacitor itself may be used advantageously as a bracket for supporting a terminal board or other circuit component. Such capacitor constructions can also be employed advantageously with other components such as resistors or inductors to form integral networks of simplified construction having lower cost, easy mounting, and high reliability.

The present invention provides novel devices of the type referred to above, which may be produced economically with a high degree of precision.

In the prior art, feed-thru capacitors have suffered from a tendency to resonate at high frequencies because the thickness of the dielectric of the capacitor approaches a half-wave length, the length of which is, in a dielectric, many times less than the length in air. The capacitor, therefore, acts as a parallel resonant circuit with an inductance in parallel with the capacitance such that the purpose of the capacitor in providing a low impedance by-pass for high frequencies is defeated, since the impedance of a parallel resonant circuit is high at the resonant frequency. The capacitor of the present invention, by reason of its thin dielectric layer, does not experience these difficulties.

Accordingly, it is the principal object of the present invention to provide novel capacitors which are adapted to be mounted in fixed relation to a conductive wall and which may be economically produced with a high degree of quality and precision.

Another object of the present invention is to provide novel capacitors employing a thin layer of a metallic oxide as a dielectric material.

Another object of the present invention is to provide novel capacitors having a thin dielectric layer formed in situ upon the surface of a metal member.

A further object of the present invention is to provide capacitors adapted to be rigidly mounted to a conductive wall, which capacitors are durable and reliable.

Another object of the present invention is to provide capacitors which are formed integrally with a sheet metal wall, such that the wall forms one electrode of the capacitor.

Other and further objects and advantages of the present invention will be more fully understood by an examination of the accompanying description, claims and drawings.

In one embodiment of the present invention, there is provided a feed-thru capacitor having a hollow eyelet provided with a circumferential projection, the eyelet being adapted to be disposed in an aperture of a conductive wall with the projection abutting the wall. The hollow eyelet is made of, or coated with, a metal which forms a relatively continuous oxide having good dielectric properties. An oxide coating is provided on the inside and outside surfaces of the eyelet and each oxide coating is overlain with a layer of conductive material. The conductive material on the outside surface of the eyelet is in electrical contact with the wall, and a conductive feed-thru member is inserted in the eyelet and is in electrical contact with the interior conductive layer, the two ends of the feed-thru member comprising a first common terminal of the capacitor, and the exterior conductive layer forming the second terminal of the capacitor.

In another embodiment of the present invention, there is provided a feed-thru capacitor comprising a metal rod having an upset portion in the form of a circumferential projection. The central portion of the rod is provided with an oxide coating, and this coating is overlain with an additional coating of conductive material. The capacitor is adapted to be disposed in an aperture of a conductive wall with the conductive coating on the exterior of the projection in electrical contact with such wall. The terminal portions of the rod are not provided with an oxide coating, and form a first common terminal of the capacitor, the second terminal of the capacitor being formed by the external conductive coating.

In a further embodiment of the present invention, there is provided a standoff capacitor having a metal rod adapted to pass through an aperture in a conductive wall, the rod being provided with first and second spaced apart circumferential projections. The first projection is adapted to abut against the wall and be in electrical contact therewith. Between the first and second projections, the rod is covered with an oxide coating which is in turn covered by a layer of conductive material overlying the oxide coating and insulated from the rod thereby. The layer of conductive material forms one terminal of the capacitor while the metal of the rod itself forms the other terminal which is connected to the wall.

Each of the embodiments of the present invention comprises a capacitor adapted to be rigidly supported by a conductive wall, and having a pair of conductive surfaces separated by a thin layer of a metallic oxide.

For a more complete understanding of the present invention, reference will now be made to the accompanying drawings in which.

Figures 1, 3, 5:
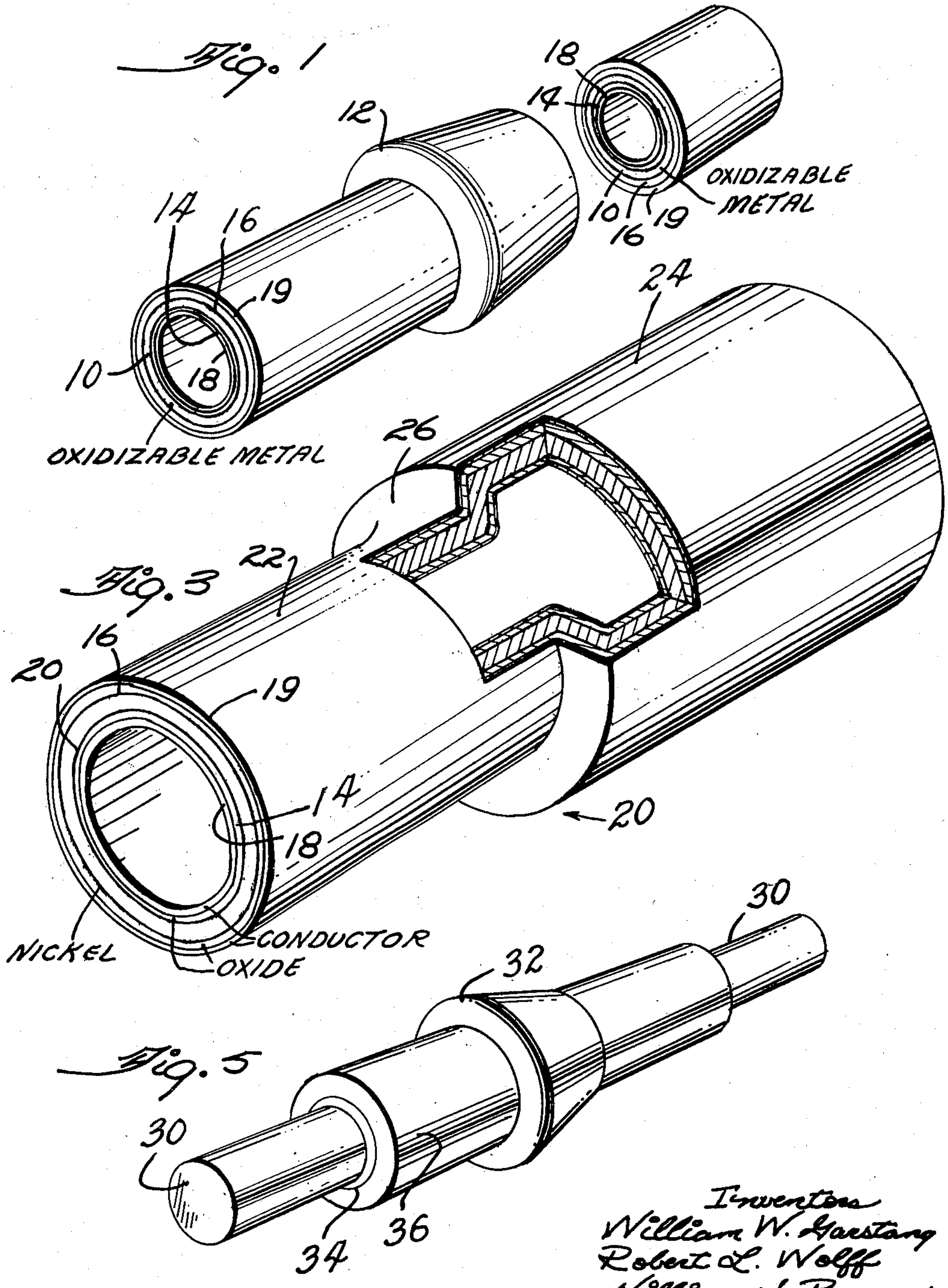
FIG. 1 is a perspective view, partly cut away, of a feed-thru capacitor constructed in accordance with the present invention.
FIG. 3 is a perspective view, partly in section, of another embodiment of a feed-thru capacitor constructed in accordance with the present invention.
FIG. 5 is a perspective view of still another embodiment of a feed-thru capacitor constructed in accordance with the present invention.

Referring now to FIG. 1, a feed-thru capacitor constructed in accordance with the present invention is shown comprising a hollow eyelet 10 of oxidizable metal which is provided with a circumferential projection 12 of greater diameter than the major portion of the eyelet 10. Both the internal and external surfaces of the eyelet 10 are capable of forming oxides having good dielectric properties and are treated to form coatings 14 and 16, respectively, while a pair of conductive coatings 18 and 19 overlie the oxide coatings 14 and 16, respectively. The oxide coatings 14 and 16 may be formed upon the eyelet 10 after the application of the conductive coatings 18 and 19. The coatings 18 and 19 are preferably applied by coating the eyelet 10 with a paint having a major amount of silver in particle form. After the paint dries, the oxide coatings are preferably created by firing the eyelet at an elevated temperature. When the eyelet is formed of nickel, it has been found that at a firing temperature of approximately 1600° F. the oxide NiO forms beneath the silver coating. It is believed that the silver coating is permeable to oxygen to permit the NiO coating to be formed in this manner. In any event, when the eyelet is thus fired, a layer of NiO forms between the nickel and silver, which layer has been found to have extremely high resistance and a dielectric constant of between 5 and 7. The preferred method of forming the NiO layer is described and claimed in the copending application of Le Roy Dilger, Ser. No. 274,043, filed April 18, 1963.

The conductive paint preferably comprises a major amount of silver particles having substantially equal dimensions in all directions, and a minor amount of a frit such as $BiO_3$.

Electrically, the feed-thru capacitor illustrated in FIG. 1, therefore, comprises a pair of series capacitors, a first existing between the eyelet 10 and the conductive coating 18, and the second existing between eyelet 10 and the conductive coating 19. The capacitance existing between the two conductive coatings 18 and 19 is, therefore, approximately one-half of the capacitance of each of the series capacitors, and breakdown voltage is approximately twice that of each of the series capacitors. The eyelet 10 is adapted to be disposed in an aperture 13 of a conductive wall 11 (FIG. 2), with the projection 12 abutting the wall at the periphery of the aperture. In order to establish good electrical contact between the conductive coating 19 and the wall, the projection 12 is preferably soldered to the wall at 15.

When thus installed, an uninsulated conductor 17 may be passed through the eyelet 10 such that it is in electrical contact with the interior of conductive surface 18. There then exists a capacitance of fixed value between the conductor and the wall 11. Alternatively, one or more conductors 17' may be soldered to the interior surface 18.

The feed-thru capacitor illustrated in FIG. 1 is also advantageously employed to reduce stray capacitance between an insulated conductor and the sheet metal wall, by adding the capacitance existing between the conductive coatings 18 and 19 in series with the capacitance existing between an insulated conductor passing through the eyelet and the interior conductive coating 18. In this manner, the capacitance between the insulated conductor and the conductive wall is reduced to a much lower value than that which would obtain if the conductor were merely passed through the aperture without the presence of the feed-thru capacitor. For this latter application, it is desirable that the capacitance of the feed-thru capacitor be as small as possible, and accordingly, the layers of oxide 14 and 16 are relatively thick. When a greater amount of capacitance is required, however, the oxide coatings 14 and 16 are made relatively thin, thus increasing the capacitance between the conductor and the wall.

In order to establish good electrical contact between the uninsulated conductor and the interior conductive coating 18, the uninsulated conductors 17' may be soldered directly to such coating, preferably by tinning the conductors and sweat soldering the same to the interior conductive surface of the capacitor by heating the eyelet 10 and then subsequently cooling it while the tinned conductors 17' are in contact with the conductive surface 18.

Figure 2:
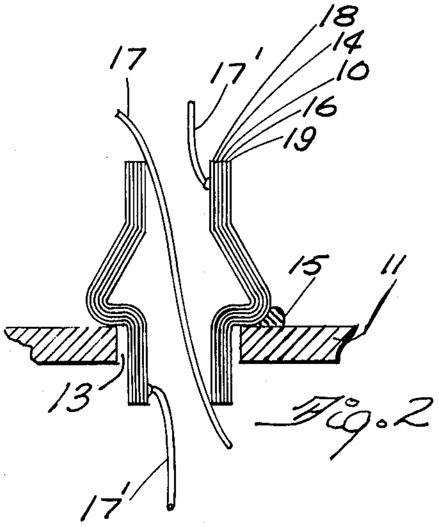
FIG. 2 is a longitudinal section of the capacitor of FIG. 1, shown in place in a conductive wall.

FIG. 3 is an illustration of a second embodiment of a feed-thru capacitor, and is similar to that illustrated in FIG. 1 except for the form of the projection which holds the feed-thru capacitor in place against the surface of the conductive wall. In the embodiment illustrated in FIG. 3, an eyelet 20 is provided having a first portion 22 of reduced diameter, and a second portion 24 of greater diameter, joined by an offset portion 26. As in the embodiment of FIG. 1, the eyelet 20 is composed of an oxidizable metal, surfaced on both sides with oxide coatings 14 and 16 and overlying conductive coatings 18 and 19. The capacitor illustrated in FIG. 3 may be used in the same manner as illustrated in FIG. 2.

Figures 4, 12:
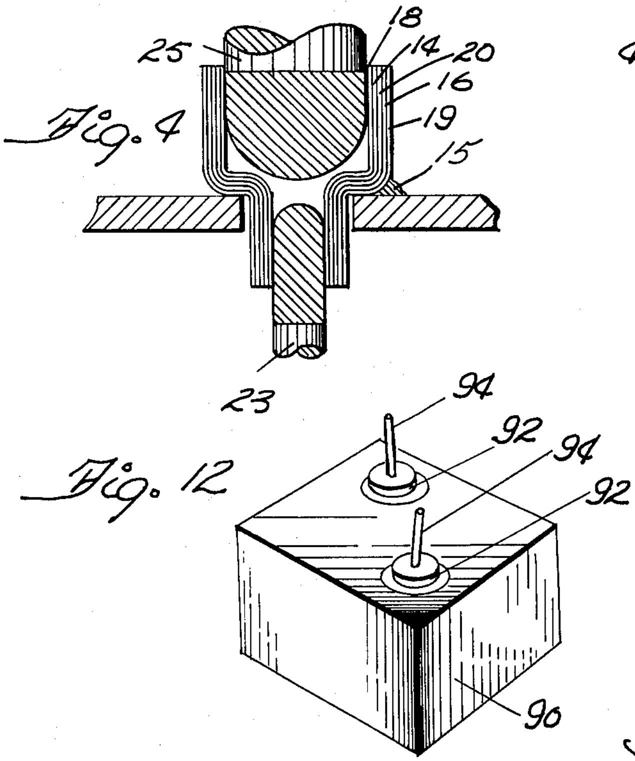
FIG. 4 is a longitudinal section of the capacitor of FIG. 3, shown in place in a conductive wall.
FIG. 12 is a perspective view of a tuner chassis employing a plurality of feed-thru capacitors.

Each of the embodiments of FIGS. 1 and 3 may alternatively be employed in the manner illustrated in FIG. 4, in which a pair of plug-in conductors 23 and 25 are shown in electrical contact with the interior surface 18. The inside diameters of the various portions of the interior conductive surface 18, and the outside diameters of the conductors 23 and 25 are chosen to ensure a tight fit, and good mechanical and electrical contact without the necessity for soldering.

In FIG. 5, there is illustrated a feed-thru capacitor which is employed solely for the function of providing a fixed capacitance between the feed-thru conductor and the wall in which it is disposed. The capacitor comprises a feed-thru conductor in the form of an oxidizable metallic rod 30 having a centrally disposed upset portion 32 in the form of a circumferential projection adapted to abut the conductive wall when the capacitor is disposed in an aperture therein. In the central portion of the rod 30 and extending for a distance on each side of the projection 32, the rod is coated with an oxide layer 34 and an overlying conductive coating 36. The oxide layer comprises the dielectric of the capacitor, with the feed-thru conductor 30 comprising a first terminal of the capacitor and the exterior conductive coating 36 comprising the second terminal of the capacitor, the second terminal being in electrical contact with the wall. The terminal portions of the feed-thru conductor 30 comprise a common terminal to which circuit components may be connected. In this embodiment, there is provided only a single oxide layer, and the capacitance is therefore greater, per unit area, than of the embodiments described above, and the breakdown voltage is correspondingly less.

In the embodiment of FIG. 5, the terminal portions of the rod 30 should, of course, remain unoxidized in order to permit conductive connection thereto of leads or other circuit components. Accordingly, the oxide which forms on the terminal surfaces of the rod 30 must be scraped off after firing. Alternatively, and preferably, the terminal portions of the rod 30 are coated with a conductive substance which does not permit the metal rod 30 to oxidize. One such substance, which is preferably used when the rod 30 is nickel, is a conductive paint containing silver in flake form and lead borosilicate. It has been found that nickel does not oxidize readily when first coated with this substance.

Figure 6:
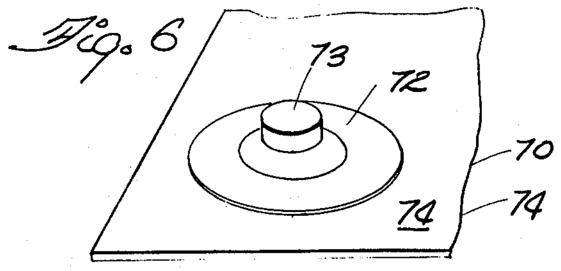
FIG. 6 is a perspective view of yet another embodiment of a feed-thru capacitor constructed in accordance with the present invention.
Figures 7, 8:
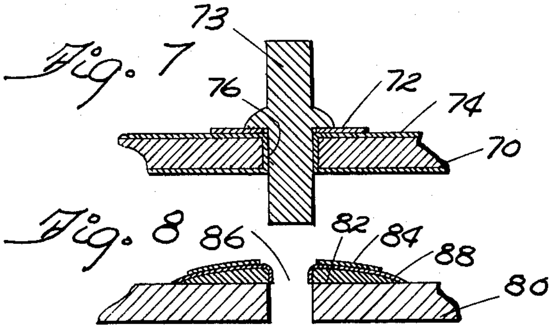
FIG. 7 is a section of the capacitor of FIG. 6, shown in place in a conductive wall.
FIG. 8 is a section of a modified embodiment of the capacitor of FIGS. 6 and 7.

Referring now to FIGS. 6 and 7, there is illustrated another embodiment of a feed-thru capacitor. A conductive wall 70 composed of oxidizable metal is painted with a spot 72 of oxygen-permeable conductive paint, and then an aperture 76 is made by drilling through both the layers 70 and 72. The coated wall 70 is then fired at an elevated temperature to permit the wall 70 to be oxidized under the conductive surface 72. The oxide layer 74 forms a dielectric of a capacitor having as its electrodes the wall 70 and the conductive surface 72. The interior sides of the aperture 76, in the course of firing, also acquire an oxide coating, which serves to insulate a conductor 73 passing through the aperture 76. The conductor 73 is preferably soldered to the conductive surface 72 in the usual way.

A plurality of the capacitors of FIGS. 6 and 7 are illustrated in FIG. 12 in combination with a tuner of a television set which is surrounded by a shield 90 comprising a plurality of conductive walls surrounding the tuner and preventing extraneous signals from radiating from the tuner. The capacitors 92 are each fixed to a wall of the shield 90 and permit electrical leads 94 to be attached to the tuner.

FIG. 8 is another form of feed-thru capacitor in which a conductive wall 80 is composed of material which does not readily form an insulating oxide. A spot of material 82 is applied to the wall 80, the material 82 being such that an oxide can readily form thereon by firing the wall 80 at an elevated temperature. The material 82 is preferably a relatively pure metal, such as nickel, electroplated onto the wall 80 with a masking technique or the like. A conductive coating 84 is applied to the upper surface of the oxidizable material 82, and an aperture 86 is drilled through the three layers 80, 82 and 84. The structure is thereafter fired to produce an oxide layer 88 between the oxidizable material 82 and the oxygen-permeable conductive surface 84. There is thus formed another type of feed-thru capacitor, in which the oxide layer 88 is the dielectric of a capacitor having as its electrodes the wall 80, and the conductive surface 84. A conductor such as conductor 73 of FIGS. 6 and 7 may be passed through the aperture 86 and soldered to the conductive surface 84 in the usual way.

Figure 10:
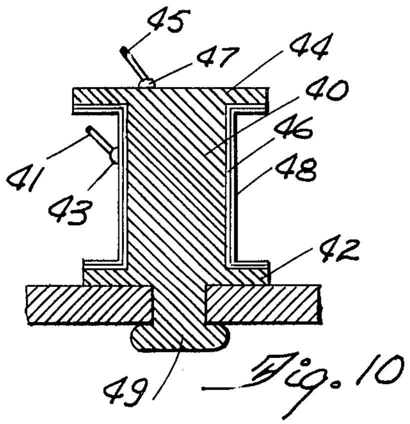
FIG. 10 is a longitudinal section of the capacitor of FIG. 9, shown in place in a sheet metal wall.
Figures 9, 11:
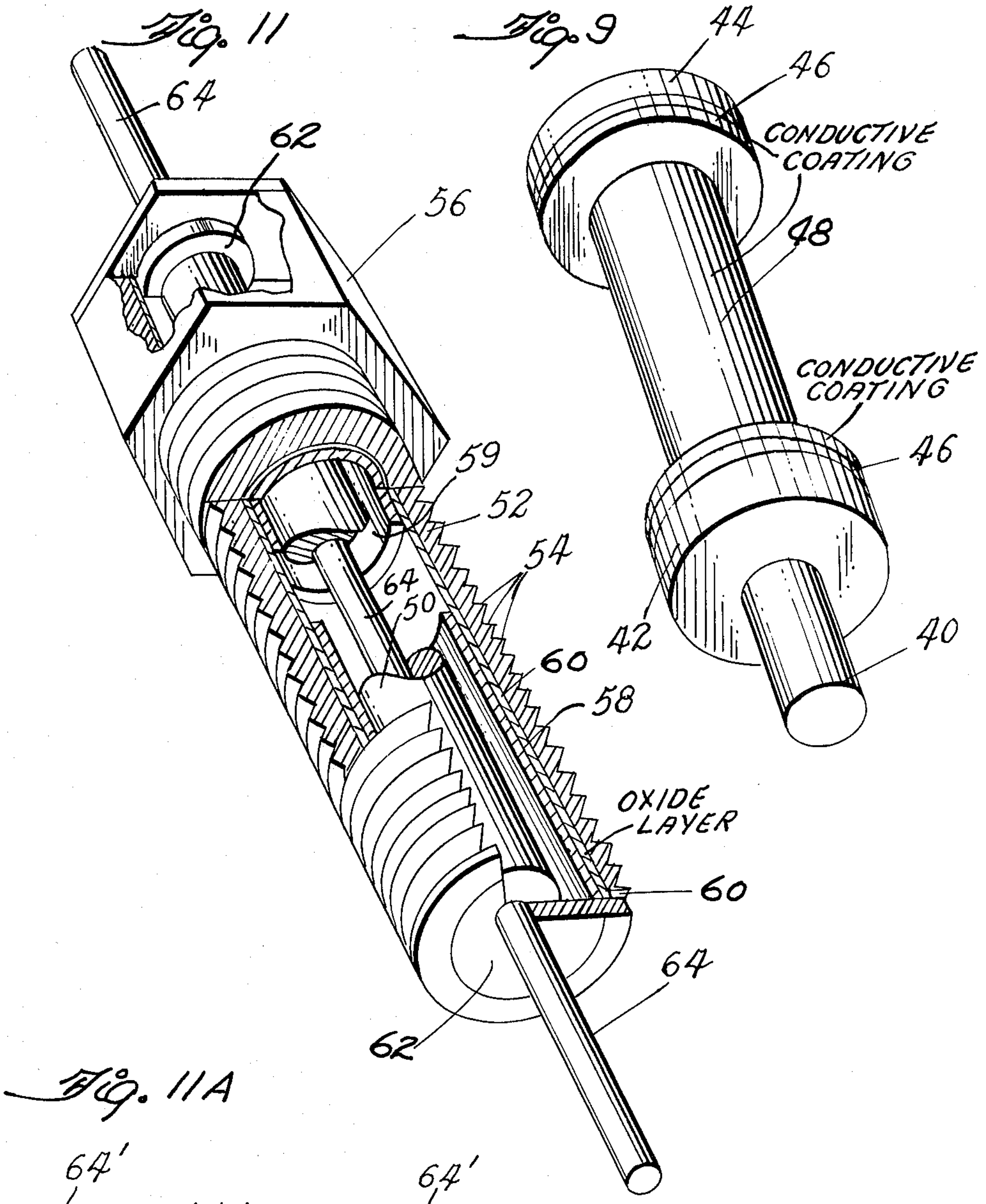
FIG. 9 is a perspective view of a standoff capacitor constructed in accordance with the present invention.
FIG. 11 is a perspective view, partly in section of an embodiment of the invention which constitutes a unique electrical network.

Referring now to FIGS. 9 and 10, there is illustrated a standoff capacitor comprising an oxidizable metallic rod 40 which is upset to form first and second circumferential projections 42 and 44. The second projection 44 is located at one of the ends of the rod 40 while the first projection 42 is more or less centrally disposed with respect to the rod 40, whereby the end of the rod 40 opposite the second projection 44 is of reduced diameter and may be disposed in an aperture in a conductive wall and retained therein either by soldering the same, or by riveting or otherwise deforming the terminal portion 49 of the rod 40 on the side of the wall opposite from the capacitor (FIG. 10). An oxide coating 46 is disposed over the surface of the rod 40 between the projections 42 and 44, and also coats the opposing faces of those projections. The oxide coating 46 is overlain with a conductive coating 48 which forms an exterior conductive surface. The oxide layer 46 comprises the dielectric of the capacitor having the rod 40 as a first terminal and the conductive surface 48 as a second terminal. The rod 40 is electrically connected to the wall in which the capacitor is mounted, while circuit components may be connected to the surface 48, either by crimping leads of such components about the surface 48, or by soldering, or both. FIG. 10 illustrates how the capacitor may be attached by crimping at 49.

Alternatively, the standoff capacitor may be made with the first projection 42 located at the extreme end of the rod 40 opposite the second projection 44, and the projection 42 is then soldered directly to a conductive wall, no aperture being required.

The standoff capacitor of FIGS. 9 and 10 thus comprises a circuit component in which a predetermined capacitance exists between the conductive surface 48 and the wall upon which it is mounted, and also serves as a bracket for supporting other circuit components such as lead 41 soldered to the surface 48 at 43. In addition, the portion of the second projection 44 which is most remote from the wall in which the capacitor is disposed, may also be employed as a terminal to which other circuit components, such as lead 45 may be conveniently electrically connected to such wall through the metal rod 40. The lead 45 is soldered to the projection 44 at 47.

Each of the above described embodiments may also be employed simply as a terminal or tie-point for interconnecting various circuit components at a point electrically remote from the wall in which the unit is mounted. These are particularly useful with circuits for handling relatively low frequencies, at which a capacitor has a very high impedance. When used for such application, the oxide dielectric layer 46 (FIG. 9) is made relatively thick to reduce the capacitance of the unit so as to further increase its impedance and its breakdown voltage. When so formed, a conductive surface is isolated from the conductive wall, and becomes a convenient terminal to which the terminals of circuit components may be connected.

Referring now to FIG. 11, there is illustrated another embodiment of a feed-thru capacitor which is provided with means for increasing the inherent series inductance of the feed-thru conductor, such as to form a filter network having a series inductance with a fixed capacitance between the feed-thru conductor and the conductive wall.

The filter feed-thru capacitor of FIG. 11 includes a core 50 composed of ferrite or other material having a relatively high magnetic permeability, but with low hysteresis and eddy current losses. The ferrite core 50 is in the form of a hollow right circular cylinder, and is surrounded by a cylindrical metal bushing 52 provided with threads 54 at one end thereof, and a hexagonal-shaped head 56 at the other end. An elongated conductor 64 extends through a centrally disposed longitudinal bore in the core 50.

The metal bushing 52 is adapted to be inserted within an aperture of a conductive wall, and a nut (not shown) is threaded on the threads 54 of the bushing 52 to hold the unit in place against the wall. The nut is then rotated with respect to the hexagonal head 56, to force the head 56 against the wall and insure good electrical contact between the bushing 52 and the conductive wall in which the unit is disposed.

The interior surface of the bushing 52 is coated at each end with coatings 58 and 59 of oxygen permeable conductive material such as silver paint, and fired to produce an oxide layer 60 between the bushing 52 and the conductive layers 58 and 59.

The oxide layer 60 forms the dielectric in a pair of capacitors having individual terminals formed by the interior conductive surfaces 58 and 59, and a common terminal formed by the metallic bushing 52. The oxide layer 60 insulates the conductive coatings 58 and 59 from the bushing 52. At each end of the unit, the space between the end of the ferrite core 50 and the end of the silver coating 58 is filled with a plug of solder 62 which, preferably, is poured into place around the conductor 64 while molten, to form a good electrical contact with the conductive surfaces 58 and 59, and the conductor 64. A separate capacitor is therefore connected from each end of the conductor 64 to the metallic bushing 52. The conductor 64 is held rigidly in place by the solder plugs 62 at the ends of the capacitor. The presence of the ferrite core 50 surrounding the conductor 54 reduces the reluctance of the path for the magnetic flux produced by the current flowing through the conductor 64.

The effect of providing a low reluctance flux path outside the conductor 64 is that the flux density produced by current flowing through the conductor 64 is increased, and the lengths of the various flux paths are also increased. This results in a greater number of flux linkages, and, therefore, a correspondingly greater inductance.

Figure 11A:
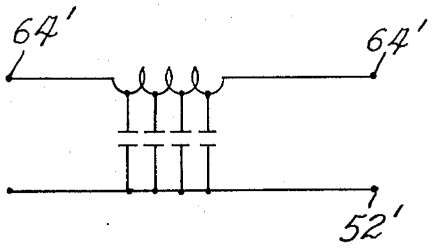
FIG. 11A is a schematic diagram of the equivalent circuit of the structure of FIG. 11.

The equivalent electrical circuit of the feed-thru capacitor of FIG. 11 is illustrated in FIG. 11A, which shows a Pi network having a series inductance between the terminals 64', and capacitances 58' and 59' across the input and output, with a common terminal 52'. It is thus evident that the structure of FIG. 11 may advantageously be employed as a low pass filter, particularly at frequencies in the vicinity of 50 megacycles, in which the LC product for resonance is quite small.

The above embodiments have been described particularly with respect to nickel and nickel oxide. It should be understood, however, that other metals and alloys may be substituted for nickel, the only requirement being that an insulating oxide may be formed between the surface of the metal and the conductive surface applied to such metal. Other metals which may be employed include titanium, tantalum, and aluminum. In the embodiment of FIG. 5, a metal or alloy which is ferromagnetic is preferred since the series inductance is greater when a ferromagnetic metal is used.

Without further elaboration, the foregoing will so fully explain the character of the present invention that others may, by applying current knowledge, readily adapt the same for use under varying conditions of service while retaining certain features which may properly be said to constitute the essential items of novelty involved, which items are intended to be defined and secured by the following claims.

What is claimed is:

1. A feed-thru capacitor comprising a member formed essentially of nickel having a first portion of reduced diameter, a second portion of greater diameter, and an offset portion interconnecting said first and second portions, substantially all of the outer surface of said member being covered with a thin layer of NiO, and a thin conductive layer covering substantially all of said NiO layer, said member forming one terminal of said capacitor and said conductive layer forming a second terminal of said capacitor.

2. A feed-thru capacitor comprising a hollow member formed essentially of nickel having a first hollow portion of reduced diameter, a second hollow portion of greater diameter, and a flange-like offset portion interconnecting said first and second portions, substantially all of the outer surface of said hollow member being covered with a thin outer layer of NiO, substantially all of the inner surface of said hollow member being covered with a thin inner layer of NiO, an outer conductive layer covering substantially all of said outer NiO layer, and an inner conductive layer covering substantially all of said inner NiO layer, said inner and outer conductive layers forming two terminals of said capacitor.

3. A stand off capacitor comprising a member formed essentially of nickel having a first portion of reduced diameter, a second portion of greater diameter, and an offset portion interconnecting said first and second portion, said first portion being adapted to be deformed to hold a support member in fixed relation between said first portion and said offset portion, a thin layer of NiO covering the surface of said second portion, and a thin conductive layer covering a portion of said NiO layer, said member forming one terminal of said capacitor and said conductive layer forming a second terminal of said capacitor.

4. A feed-thru capacitor comprising a thin self-supporting member formed essentially of nickel and having two opposite surfaces, an aperture in said member interconnecting said two surfaces, a thin continuous layer of NiO covering both of said two surfaces in the vicinity of said aperture and covering the surface of a wall defining said aperture, a thin conductive layer covering a portion of said NiO layer and an elongate conductor extending through said aperture and contacting said conductive layer, said member forming one terminal of said capacitor and said elongate conductor forming a second terminal of said capacitor.

5. A feed-thru capacitor comprising a thin self-supporting member having two opposite surfaces, an aperture in said member interconnecting said two surfaces, one of said surfaces having a coating of nickel in the vicinity of said aperture, a thin layer of NiO covering said nickel coating, and a thin conductive layer covering a portion of said NiO layer, said member forming one terminal of said capacitor and said conductive layer forming a second terminal of said capacitor.

References Cited by the Examiner

UNITED STATES PATENTS

| | | | |
|---|---|---|---|
| 2,175,689 | 10/1939 | Gallup. | |
| 2,668,946 | 2/1954 | Bennett | 317—242 X |
| 2,785,350 | 3/1957 | Toppari | 317—258 X |
| 2,899,345 | 7/1959 | Oshry | 317—258 X |
| 3,035,237 | 5/1962 | Schlicke | 317—242 X |
| 3,085,052 | 4/1963 | Sibert | 317—258 X |

FOREIGN PATENTS

| | | |
|---|---|---|
| 438,444 | 11/1935 | Great Britain. |
| 807,987 | 1/1959 | Great Britain. |

ROBERT K. SCHAEFER, *Primary Examiner.*

LARAMIE E. ASKIN, JOHN F. BURNS, *Examiners.*

D. J. BADER, *Assistant Examiner.*